United States Patent
Nachmany

(10) Patent No.: US 11,924,912 B2
(45) Date of Patent: Mar. 5, 2024

(54) LOW ENERGY MUTUAL DETECTION OF NEARBY SHORT RANGE TRANSCEIVERS

(71) Applicant: ATTENTI ELECTRONIC MONITORING LTD, Tel Aviv (IL)

(72) Inventor: Carmel Nachmany, Petah-Tikva (IL)

(73) Assignee: ATTENTI ELECTRONIC MONITORING LTD, Tel-Aviv (IL)

( * ) Notice: Subject to any disclaimer, the term of this patent is extended or adjusted under 35 U.S.C. 154(b) by 0 days.

(21) Appl. No.: 17/551,212

(22) Filed: Dec. 15, 2021

(65) Prior Publication Data

US 2023/0171578 A1 Jun. 1, 2023

(30) Foreign Application Priority Data

Nov. 28, 2021 (IL) .......................................... 288494

(51) Int. Cl.
*H04W 8/00* (2009.01)
*H04W 4/80* (2018.01)

(52) U.S. Cl.
CPC ............. *H04W 8/005* (2013.01); *H04W 4/80* (2018.02)

(58) Field of Classification Search
CPC ................................ H04W 8/005; H04W 4/80
See application file for complete search history.

(56) References Cited

U.S. PATENT DOCUMENTS

| | | | |
|---|---|---|---|
| 9,668,209 B1 | 5/2017 | Knaappila | |
| 2005/0083902 A1* | 4/2005 | Hashimoto | H04W 52/029 370/349 |
| 2014/0302787 A1* | 10/2014 | Rantala | H04W 8/005 455/41.2 |

* cited by examiner

*Primary Examiner* — Wen W Huang
(74) *Attorney, Agent, or Firm* — Soroker Agmon Nordman Riba

(57) ABSTRACT

A method of detecting nearby monitoring devices by a monitoring device, including using an internal real-time clock to keep track of periodic preselected times for the monitoring devices to communicate with each other; upon approaching the preselected times, using a processor and short range transceiver to perform a three stage process that enables nearby monitoring devices to take turns communicating their identity to each other.

20 Claims, 5 Drawing Sheets ically complicated to remove the electronic monitoring device and the person is prohibited from removing the electronic monitoring device to prevent violating a location based policy.

LOW ENERGY MUTUAL DETECTION OF NEARBY SHORT RANGE TRANSCEIVERS

TECHNICAL FIELD

The present disclosure relates generally to an electronic monitoring device for attaching to a limb of a person and more specifically wherein the electronic monitoring device is able to detect other electronic monitoring devices in its vicinity.

BACKGROUND

It is common practice today to attach a body worn electronic monitoring device to a person for monitoring their location and/or enforcing a location based policy such as house arrest, curfew sentencing, pre-trial sentencing, parole, probation and a restraining order. Typically the electronic monitoring device is attached with a strap to the ankle of the person or to other limbs, for example the wrist of the person. It is typically complicated to remove the electronic monitoring device and the person is prohibited from removing the electronic monitoring device to prevent violating a location based policy.

When enforcing a restraining order, the user may be prohibited from coming near another person bearing or wearing another electronic monitoring device. One option to enforce such a policy would be for each device to continuously notify a server of its location. However this places a large burden on the server to compare the location of each device with all other devices to prevent any device from violating rules, for example for one device to come near another. Additionally if one of the devices loses communication with the server, the server is unaware of its location and cannot notify the other devices.

Alternatively, the devices may transmit a short range signal continuously so that any device can detect if any other device is in the vicinity. However the devices are generally battery powered. Such a method consumes a lot of energy and would generally cause the battery to be depleted very quickly.

Bluetooth transceivers search for nearby transceivers only during the "pairing" process. WiFi transceivers search for nearby transceivers only while connecting to a new network. Thus Bluetooth and WiFi can use a brute force method for a limited period of time and there is no problem with battery consumption. However the electronic monitoring devices would need to continuously search to prevent prohibited devices from approaching them.

SUMMARY

An aspect of an embodiment of the disclosure relates to a monitor device that periodically checks if other monitoring devices are in the nearby area. The monitoring devices are all equipped with a real-time clock to keep track of the time and attempt to keep the monitoring devices synchronized. At periodic preselected times all the devices attempt to search for other monitoring devices and transmit a control signal that provides information of the identity of the monitoring device. The monitoring devices all execute a common method of communication to enable each device to transmit its control signal and receive the control signals of all the other devices in the nearby area and prevent transmission collisions. In order to conserve energy the monitoring devices do not communicate continuously but rather only at about the periodic preselected times.

The common method uses three stages. In the first stage all the devices listen for a first selected amount of time to detect monitoring devices with real-time clocks that start earlier than other monitoring devices. In the second stage all the devices are set with a different delay time value so that each will attempt to transmit at a different time to prevent transmission collisions. Each monitoring device listens during the delay time and when the monitoring device's delay time is over and nobody is transmitting the monitoring device begins to transmit. If the monitoring device detects transmission by another device the monitoring device waits until the end of the transmission, records the identity of the transmitting monitoring device and then waits again for the delay time before transmitting its control signal, once the monitoring device, succeeds to transmit the control signal it activates a third stage wherein the monitoring device listens for a third selected amount of time for control signals of other monitoring devices in the nearby area that did not yet transmit their control signal.

There is thus provided according to an embodiment of the disclosure, a method of detecting nearby monitoring devices by a monitoring device, comprising:

Using an internal real-time clock to keep track of periodic preselected times for the monitoring, devices to attempt to communicate with each other;

Upon approaching the preselected times, using a processor and short range transceiver to perform the following three stages:

a) Placing the monitoring device in receive mode for a first selected amount of time before reaching the periodic preselected times and listening for control signals identifying a transmitting monitoring device by nearby monitoring devices;

b) Placing the monitoring device in receive mode for a second selected amount of time and upon completing without detecting nearby monitoring devices, the monitoring device transmits its control signal;

c) Placing the monitoring device in receive mode for a third selected amount of time after transmitting the control signal;

At any stage while in receive mode upon detecting a control signal transmitted from a nearby monitoring device the monitoring device waits until the end of the transmission of the control signal and records the identity of the nearby monitoring device detected;

During the first selected amount of time and the third selected amount of time the monitoring device resumes monitoring in receive mode until completing the respective selected amount of time; during the second selected amount of time the monitoring device restarts stage b after recording the identity of the detected nearby monitoring device, without transmitting the control signal of the monitoring device.

In an embodiment of the disclosure, the second selected amount of time is unique for each monitoring device. Optionally, the second selected amount of time is randomly selected. In an embodiment of the disclosure, the second selected amount of time is reselected each time stage b is restarted. Optionally, the first selected amount of time and third selected amount of time are selected based on the number of monitoring devices expected to be nearby. In an embodiment of the disclosure, the first selected amount of time and third selected amount of time are the same for all the monitoring devices. Alternatively, the first selected amount of time and third selected amount of time are the same for each monitoring device.

In an embodiment of the disclosure, communication time to detect nearby monitoring devices is less than a tenth of a time between two consecutive periodic preselected times. Optionally, the first selected amount of time is selected as a function of the accuracy of the internal real-time clock of the monitoring devices and accuracy of the synchronization between the monitoring devices. In an embodiment of the disclosure, the second selected amount of time is smaller than the third selected amount of time.

There is further provided according to an embodiment of the disclosure, a monitoring device, comprising:

A processor and memory configured to store and execute a program to detect nearby monitoring devices;

A real-time clock configured to keep track of periodic preselected times for the monitoring devices to communicate with nearby monitoring devices;

A short range transceiver configured to communicate with nearby monitoring devices;

Wherein the processor executes a program to perform the following three stages upon approaching the periodic preselected times:
  a) Placing the monitoring device in receive mode for a first selected amount of time before reaching the periodic preselected times and listening for control signals identifying communicated transmitting monitoring device by nearby monitoring devices;
  b) Placing the monitoring device in receive mode for a second selected amount of time and upon completing without detecting nearby monitoring devices, the monitoring device transmits its control signal;
  c) Placing the monitoring device in receive mode for a third selected amount of time after transmitting the control signal;

At an stage while in receive mode upon detecting a control signal transmitted from a nearby monitoring device the monitoring device waits until the end of the transmission of the control signal and records the identity of the nearby monitoring device detected;

During the first selected amount of time and the third selected amount of time the monitoring device resumes monitoring in receive mode until completing the respective selected amount of time; during the second selected amount of time the monitoring device restarts stage b after recording the identity of the detected nearby monitoring device, without transmitting the control signal of the monitoring device.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
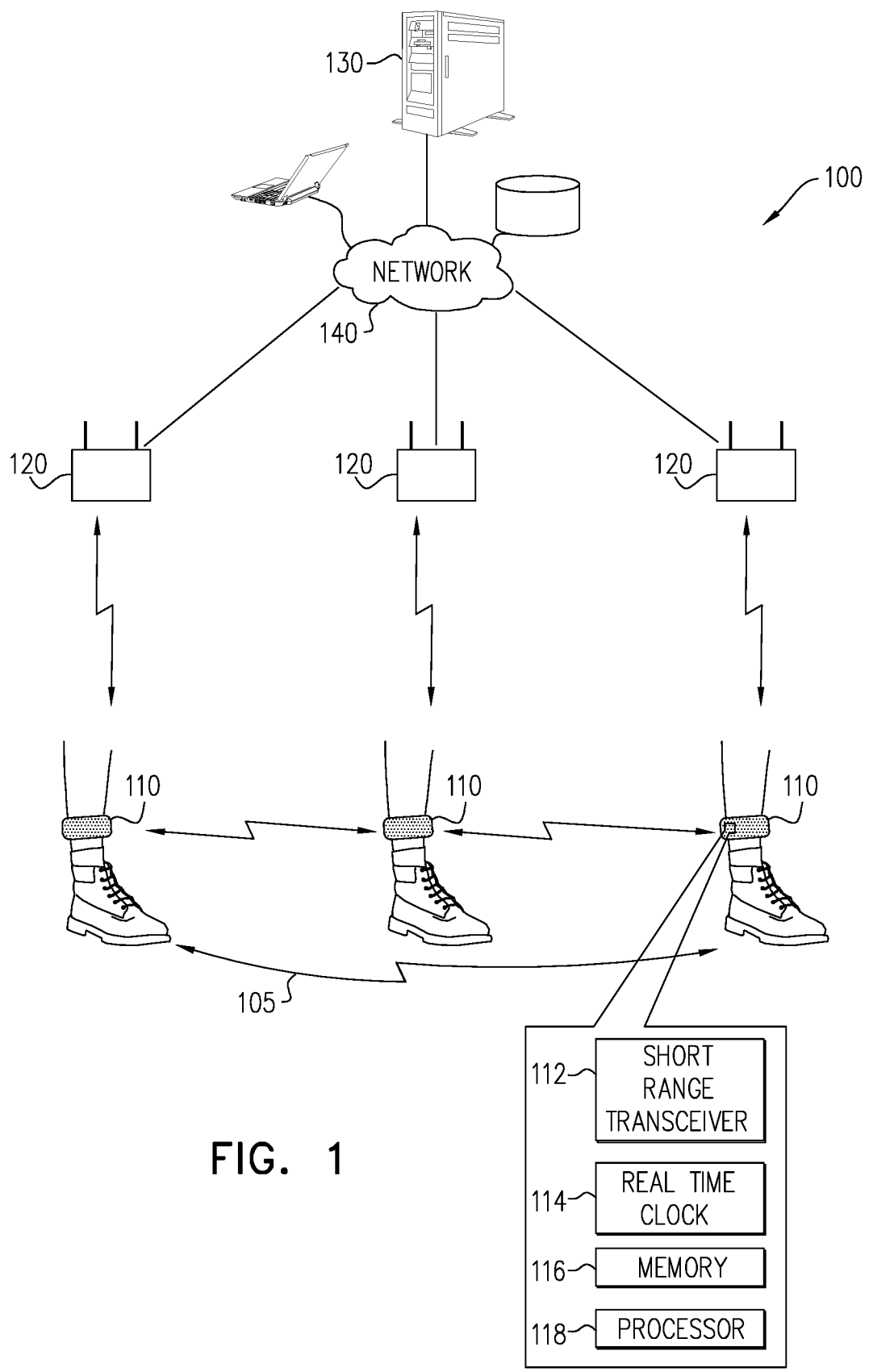
FIG. 1 is a schematic illustration of a system for monitoring a group of electronic monitoring devices, according to an embodiment of the disclosure.

FIG. 1 is a schematic illustration of a system 100 for monitoring a group of electronic monitoring devices 110, according to an embodiment of the disclosure. Optionally, each monitoring device 110 communicates with a central server 130 over a network 140. In an embodiment of the disclosure, local routers 120 are installed at specific geographic locations and each monitoring device 110 communicates with the central server 130 via the local router 120 and network 140. Optionally, local routers 120 can be domestic Wi-Fi routers, cellular base stations or other types of local communication routers.

In an embodiment of the disclosure, each monitoring device 110 includes a short range transceiver 112, which is configured to use a low energy short range communication signal 105 to notify other monitoring devices 110 in the vicinity that the monitoring device 110 is near and to search for the existence of other monitoring devices 110 in the vicinity. In an embodiment of the disclosure, each monitoring device 110 includes also a processor 118 and memory 116 to enable execution of a program that uses the method below to enable multiple monitoring devices to synchronously notify each other that they are in the vicinity.

Figure 2:
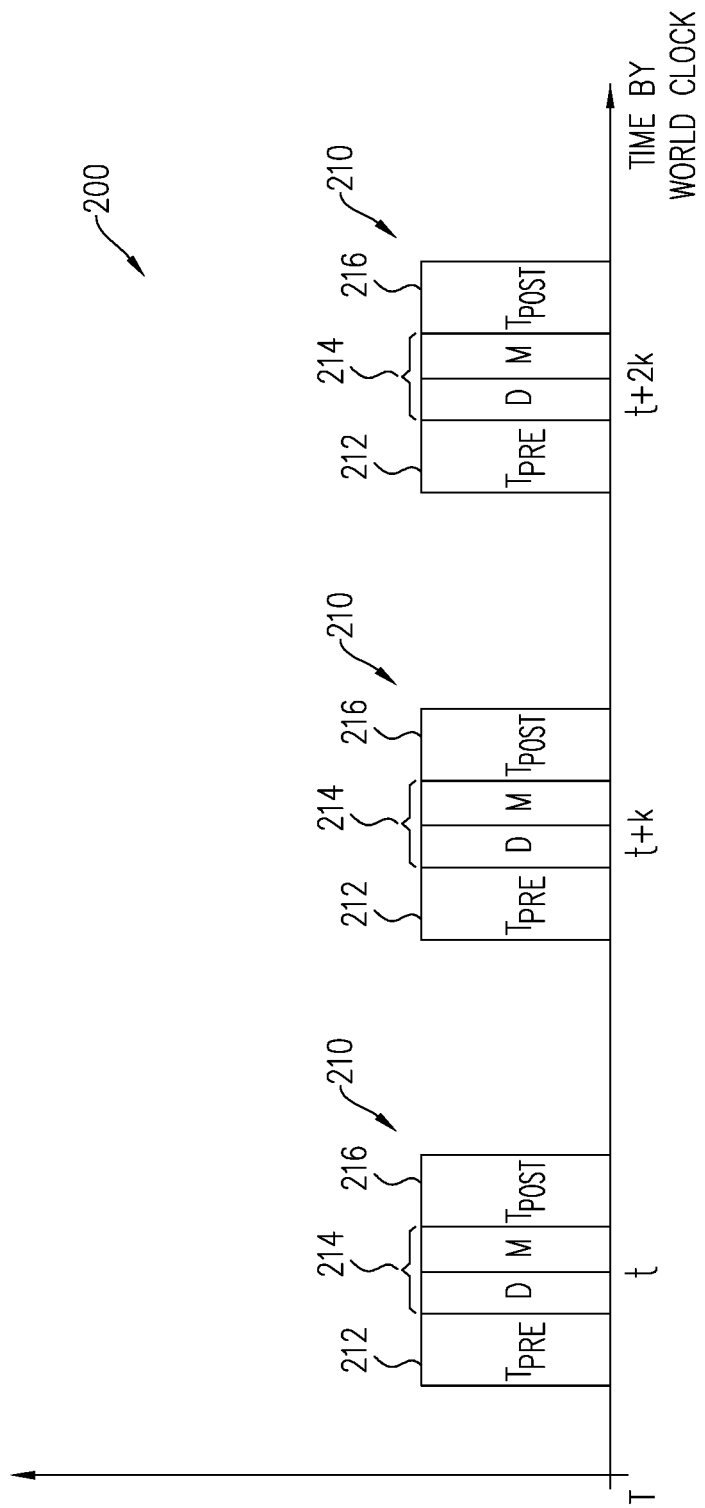
FIG. 2 is a schematic illustration of a timeline of local transmissions by a monitoring device, according to an embodiment of the disclosure.

FIG. 2 is a schematic illustration of a timeline 200 of local transmissions of short range communication signals 105 by monitoring device 110, according to an embodiment of the disclosure. Optionally, each monitoring device 110 is synchronized to initialize transmission of a control signal M periodically based on periodic preselected times T. For example at about the beginning of every minute "t" according to a common world clock and every k seconds afterwards (t, t+k, t+2k . . . ) where k is e.g. every 10-30 second. According to the method described below during a specific time interval 210 approximately at the preselected times T or slightly before the preselected times T each monitoring device 110 searches for other monitoring devices 110 nearby and takes a turn to transmit its control signal M, which identifies the monitoring device 110. Accordingly, all the monitoring devices 110 are activated for specific time intervals 210 (e.g. every 10-20 seconds for about 1 second) only at about the preselected times T and they do not need to be active continuously to prevent missing transmissions of monitoring devices 110 in the vicinity. Optionally, during the specific time intervals 210 each monitoring device 110 will perform the method described below, to prevent transmission collisions and to assure that all the monitoring devices 110 in a nearby area will each have a turn to transmit their control signal M and identify all the other monitoring devices 110 in the vicinity. Optionally, the method includes forming the specific time interval 210 from three stages:
  a) a first stage 212 of a first selected amount of time Tpre before the periodic preselected time T to detect early transmitting monitoring devices 110;
  b) a second stage 214 including a second selected amount of time referred to as delay time D and transmission of the control signal M of the monitoring device 110;
  c) a third stage 216 of a third selected amount of time Tpost after transmitting the monitoring device's control signal M to detect late monitoring devices 110.

Figure 3:
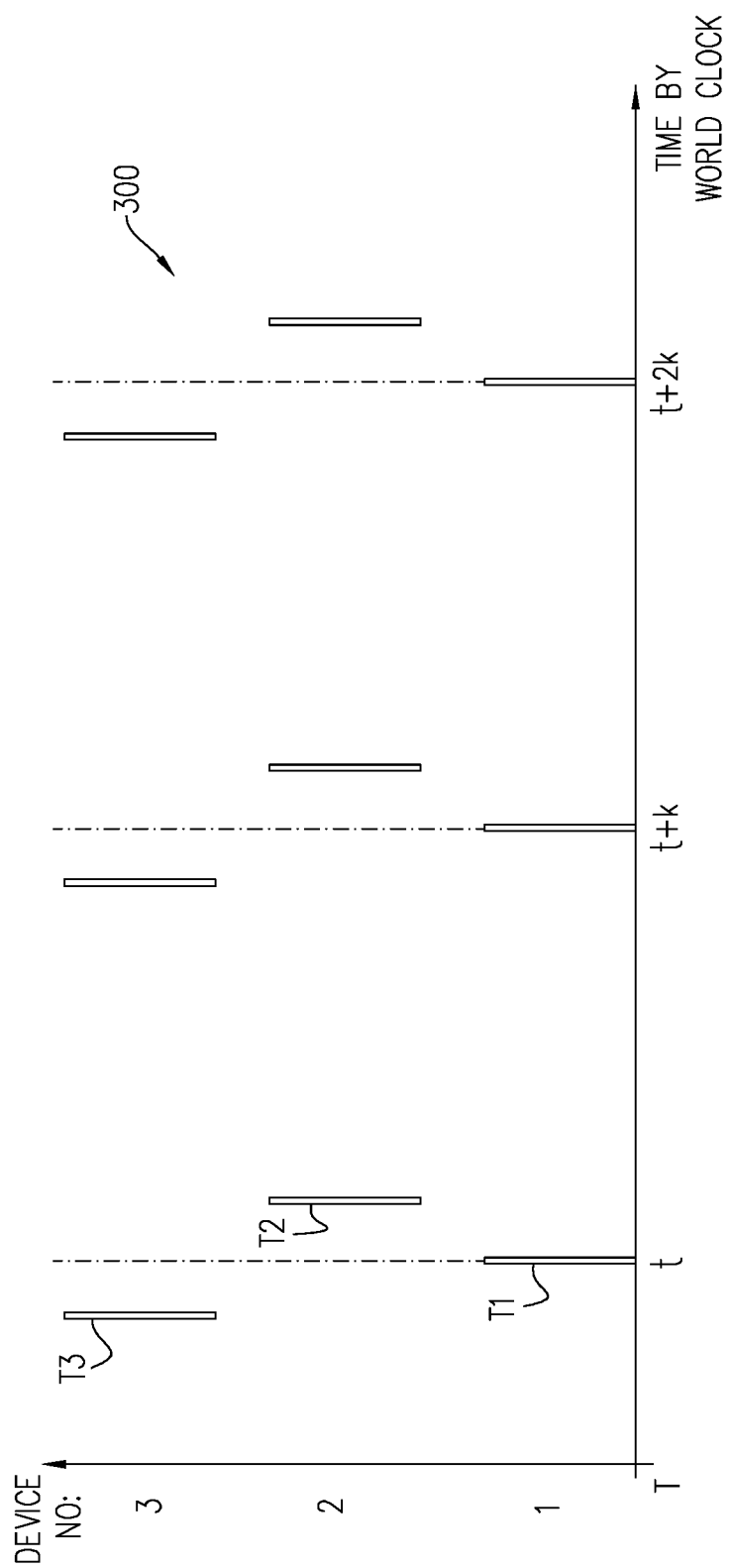
FIG. 3 is a schematic illustration of a timeline of a periodic preselected time as seen by three monitoring devices, according to an exemplary embodiment of the disclosure.

FIG. 3 is a schematic illustration of a timeline 300 of the periodic preselected times T as seen by three monitoring devices 110, according to an exemplary embodiment of the disclosure. Optionally, each monitoring device (1, 2, 3) includes a real time clock (RTC) 114 (FIG. 1) to keep track of the time, so that all the monitoring devices will be synchronized to initialize transmission of their control signal M during the common time interval 210 by the method described below at around the preselected times T (T1, T2, T3) as measured by each monitoring device 110. Optionally, the RTC 114 is kept accurate for example by:

a) Initially being set when deployed on a person and keeping accurate time;
b) Updated by communicating with server 130 to keep accurate time;
c) Using a network time protocol (NTP) to synchronize the RTC 114.

In an embodiment of the disclosure, the actual RTC 114 of each monitoring device 110 may differ by a few milliseconds (e.g. 0-100 milliseconds). Optionally, during the limited time interval 210 at about the preselected time T, all the monitoring devices 110 will listen and take turns transmitting their control packet M. In an embodiment of the disclosure, the monitoring devices 110 use the method described below to prevent transmission collisions and enable each of the monitoring devices 110 in the vicinity to transmit their control signal M, while the other monitoring devices 110 in the vicinity listen.

Figure 4:
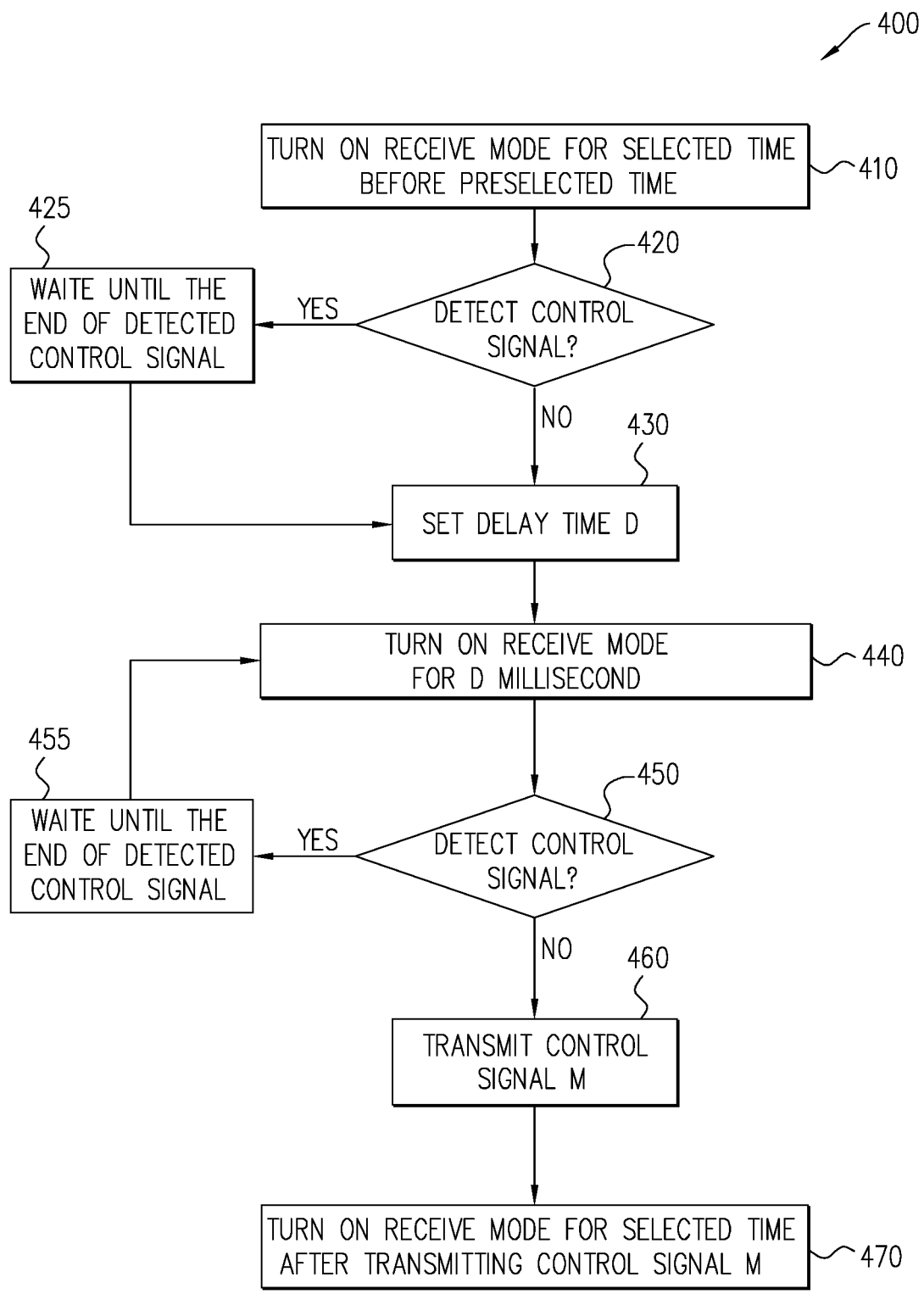
FIG. 4 is a flow diagram of a method practiced by each monitoring device to detect other monitoring devices nearby, according to an embodiment of the disclosure.

FIG. 4 is a flow diagram of a method 400 practiced by each monitoring device 110 to detect other monitoring devices 110 nearby, according to an embodiment of the disclosure. Optionally, when approaching the periodic preselected times T each monitoring device 110 performs method 400 to determine if any other monitoring devices 110 are nearby. In an embodiment of the disclosure, the monitoring device 110 turns on (410) an initial receive mode (RX) for the first selected amount of time Tpre (e.g. between 100-500 milliseconds) before the preselected times T (first stage 212). The initial receive mode catches monitoring devices 110 that have a real time clock 114, which is early, causing them to start transmitting before the preselected times T for some of the monitoring devices 110. In receive mode the monitoring device 110 attempts to detect (420) control signals M from other monitoring devices 110. If the monitoring device 110 detects a control signal M, then it waits (425) until the end of the control signal M and records the identity of the other monitoring device 110 in the vicinity. The recording may be initially to memory 116 and may be transmitted to server 130 over network 140 to act on the information. Typically a control signal M may take 5-10 milliseconds to be transmitted. If no control signal M was detected during the first selected amount of time Tpre or the monitoring device 110 finished receiving the control signal M and the first selected amount of time is finished, then monitoring device 110 initiates the second stage 214. It should be noted that after receiving a control signal M during the first stage 212, monitoring device 110 continues to listen for other control signals M. Additionally, if time Tpre is finished while receiving a control signal, the monitoring device 110 completes the reception before starting the second stage 214. In an embodiment of the disclosure, the second stage 214 includes setting (430) the delay time D (e.g. between about 2-30 milliseconds depending on the number of monitoring devices 110 expected to be in the vicinity) for the monitoring device 110 to listen in receive mode (RX) before transmitting the monitoring device's control signal M. Optionally, delay time D is randomly generated or preselected for each monitoring device 110. Optionally, the delay time D is a unique value for each monitoring device. In an embodiment of the disclosure, the delay time D may be set once or each time the monitoring device 110 is about to transmit.

Monitoring device 110 then turns on (440) receive mode for D milliseconds. The delay time assures that each monitoring device 110 will transmit at a different time even if the monitoring devices' real time clocks 114 are perfectly synchronized, since generally each monitoring device 110 sets a different value for the delay. If monitoring device 110 detects (450) another device transmitting a control signal M during the delay D, it will wait (455) until the end of the transmission and record the identity of the transmitting monitoring device 110. Then monitoring device 110 will again turn on (440) receive mode for D milliseconds. After not detecting other monitoring devices 110 transmitting during the D milliseconds the monitoring device 110 transmits (460) its control signal M for other monitoring devices 110 to receive notification of the existence of the monitoring device 110 in the vicinity. Optionally, the delay time D and control signal M transmission time together may take about 5-50 milliseconds. In an embodiment of the disclosure, delay time D is much shorter than Tpre and Tpost. However the delay time D may be started over more than once if the transmission of control signals M from other monitoring devices are detected while waiting for the delay time. Optionally, each time monitoring device 110 is ready to transmit its control signal, the monitoring device 110 will first wait for delay time D before transmitting.

Once the monitoring device 110 transmits (460) its control signal M, it turns on (470) receive mode again for the third selected amount of time Tpost to detect monitoring devices 110 that transmit after monitoring device 110 successfully transmitted. Optionally, the third selected amount of time Tpost may be about 100-500 milliseconds. Altogether the time interval for receiving and transmitting control signals may be less than or about 1 second. Thus power consumption is reduced (e.g. about 90% if k=10 seconds and about 95% if k=20 seconds) since monitoring device 110 only needs to periodically transmit and receive for 1 second for about every 10-20 seconds and not continuously. Optionally, communication time to detect nearby monitoring devices is less than a tenth or a twentieth of the time between two consecutive periodic preselected times T (e.g. t and t+k). In an embodiment of the disclosure, the third selected amount of time Tpost is much larger than the delay time D used by the monitoring devices, for example 5, 10, 15 or 20 times larger, so that any nearby monitoring devices 110 that did not manage to transmit during the first selected amount of time Tpre or the second selected amount of time D, will manage to transmit during the third selected amount of time Tpost. Optionally, if many devices are expected to be in the vicinity (e.g. more than 5, 10, 15 or 20), then the value of the third selected amount of time Tpost may be increased.

In some embodiments of the disclosure, Tpre and Tpost may be different for each monitoring device 110 or may be the same for all monitoring devices 110. Likewise Tpre may be the same as Tpost or may be different.

In some embodiments of the disclosure, the values of Tpre and Tpost are set according to the environment in which the user of the monitoring device is expected to be located. For example if the monitoring device is expected to be in the same area with many other monitoring devices 110, Tpre and Tpost may be increased to handle many devices. If the monitoring device is expected to be in a location with only a few monitoring devices 110, Tpre and Tpost may be reduced. Optionally, Tpre may be reduced if the real-time clocks 114 are accurate and the monitoring devices 110 are almost entirely synchronized. In some embodiments of the disclosure, Tpre and/or Tpost may be given random values.

Figure 5:
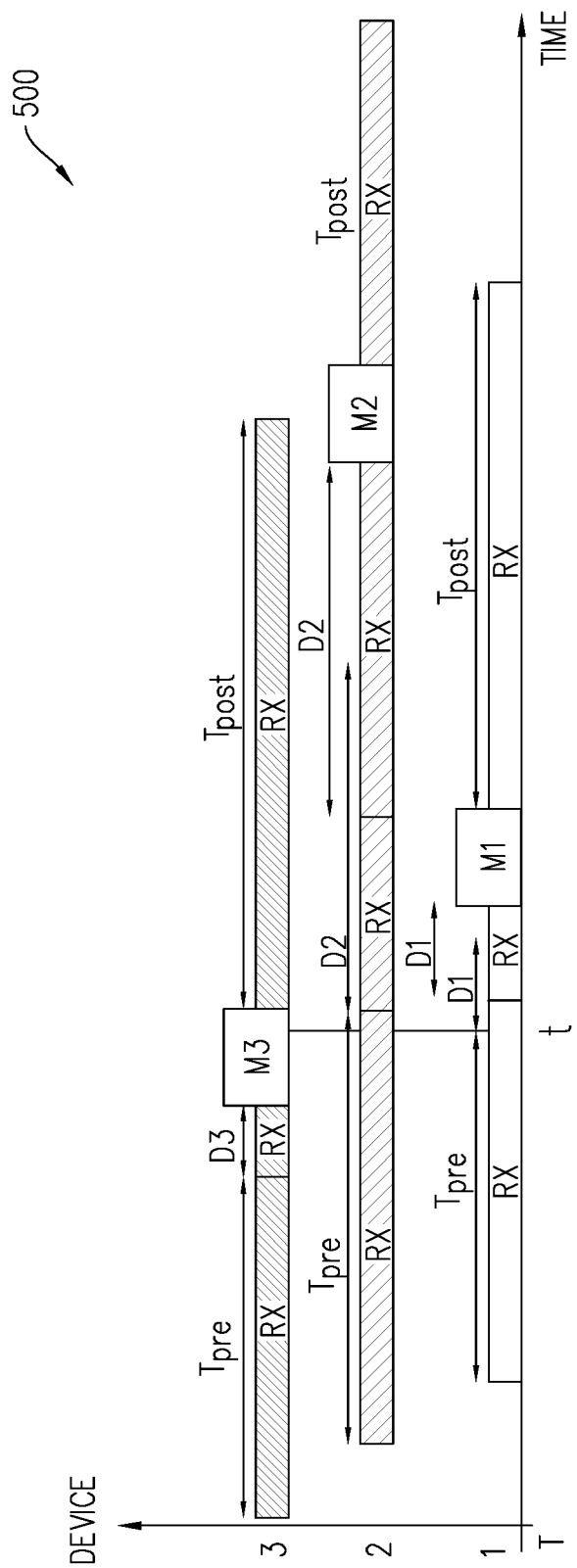
FIG. 5 is a schematic illustration of a timeline of three monitoring devices implementing a method of detecting monitoring devices in their vicinity, according to an embodiment of the disclosure.

FIG. 5 is a schematic illustration of a timeline 500 of three monitoring devices 110 implementing the above method of detecting monitoring devices 110 in their vicinity, according to an embodiment of the disclosure.

In an embodiment of the disclosure, each monitoring device 110 uses its short range transceiver 112 to perform the method of detecting other nearby monitoring devices (e.g. within a range of up to about 100-200 meters). As shown in FIG. 5 the first monitoring device 110 (with transceiver 1) performed the following:

a. Turned on RX (receive mode) Tpre milliseconds before the designated time;
b. Randomized a number D1 for transceiver 1;
c. Detected the control signal M3 of transceiver 3 before the expiration of Tpre+D1;
d. Waited until the end of control signal M3 of transceiver 3;
e. Turned on RX for an additional D1 milliseconds after M3 of transceiver 3 finished;
f. Did not detect any transmissions until the expiration of D1;
g. Transmitted the control signal M1 for transceiver 1;
h. Turned on RX for an additional Tpost milliseconds;
i. Detected the control signal M2 of transceiver 2;
j. Turned on RX for the remainder of Tpost.

As can be seen, transceiver 1 was able to detect transceiver 3 (at step d) and transceiver 2 (at step i).

The second monitoring, device 110 (with transceiver 2) performed the following:

a. Turned on RX (receive mode) Tpre milliseconds before the designated time;
b. Randomized a number D2 for transceiver 2;
c. Detected the control signal M3 of transceiver 3 before the expiration of Tpre+D2;
d. Waited until the end of the control signal M3 of transceiver 3;
e. Turned on RX for an additional D2 milliseconds;
f. Detected the control signal M1 of transceiver 1 before the expiration of D2;
g. Waited until the end of the control signal M1 of transceiver 1;
h. Turned on RX for an additional D2 milliseconds;
i. Did not detect any transmissions until the expiration of D2;
j. Transmitted the control signal M2 for transceiver 2;
k. Turned on RX for an additional Tpost milliseconds.

As can be seen, transceiver 2 was able to detect transceiver 3 (at step d) and transceiver 1 (at step g).

The third monitoring device 110 (with transceiver 3) performed the following:

a. Turned on RX (receive mode) Tpre milliseconds before the designated time;
b. Randomized the number D3 for transceiver 3;
c. Did not detect any transmissions until the expiration of Tpre+D3;
d. Transmitted control signal M3;
e. Turned on RX for an additional Tpost milliseconds;
f. Detected the control signal M1 of transceiver 1 before the expiration of Tpost;
g. Wait until the end of control signal M1 from transceiver 1;
h. Turned on RX for an additional Tpost milliseconds
i. Detected the control signal M2 of transceiver 2 before the expiration of Tpost;
j. Waited until the end of control signal M2 of transceiver 2.

As can be seen, transceiver 3 was able to detect transceiver 1 (at step f) and transceiver 2 (at step i) during the specific time interval 210.

Accordingly, as shown in the above example each monitoring device 110 was able to transmit its control signal M and detect the control signal M of all the other monitoring devices 110 in the vicinity. The above example relates to three monitoring devices 110, however the method may be applied for any number of devices. Optionally, the values of Tpre and Tpost may be adjusted according to the number of expected nearby monitoring devices 110.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove but rather will be defined by the claims.

I claim:

1. A method of detecting nearby monitoring devices by a monitoring device, comprising:
using an internal real-time clock to keep track of periodic preselected times for the monitoring devices to attempt to communicate with each other;
upon approaching the preselected times, using a processor and short range transceiver to perform the following three stages:
a) placing the monitoring device in receive mode for a first selected amount of time before reaching the periodic preselected times; wherein in receive mode the monitoring device is configured to listen for control signals identifying a transmitting monitoring device from nearby monitoring devices;
b) placing the monitoring device in receive mode for a second selected amount of time and upon completing without detecting nearby monitoring devices, the monitoring device transmits its control signal:
c) placing the monitoring device in receive mode for a third selected amount of time after transmitting the control signal;
at any stage while in receive mode upon detecting a control signal transmitted from a nearby monitoring device the monitoring device waits until the end of the transmission of the control signal and records the identity of the nearby monitoring device detected;
during the first selected amount of time and the third selected amount of time the monitoring device resumes monitoring in receive mode until completing the respective selected amount of time; during the second selected amount of tune the monitoring device restarts stage b after recording the identity of the detected nearby monitoring device, without transmitting the control signal of the monitoring device.

2. The method of claim 1, wherein the second selected amount of time is unique for each monitoring device.

3. The method of claim 1, wherein the second selected amount of time is randomly selected.

4. The method of claim 3, wherein the second selected amount of time is reselected each time stage b is restarted.

5. The method of claim 1, wherein the first selected amount of time and third selected amount of time are selected based on the number of monitoring devices expected to be nearby.

6. The method of claim 1, wherein the first selected amount of time and third selected amount of time are the same for all the monitoring devices.

7. The method of claim 1, wherein the first selected amount of time and third selected amount of time are the same for each monitoring device.

8. The method of claim 1, wherein communication time to detect nearby monitoring devices is less than a tenth of a time between two consecutive periodic preselected times.

9. The method of claim 1, wherein the first selected amount of time is selected as a function of the accuracy of the internal real-time clock of the monitoring devices and accuracy of the synchronization between the monitoring devices.

10. The method of claim 1, wherein the second selected amount of time is smaller than the third selected amount of time.

11. A monitoring device, comprising:
- a processor and memory configured to store and execute a program to detect nearby monitoring devices;
- a real-time clock configured to keep track of periodic preselected times for the monitoring devices to communicate with nearby monitoring devices;
- a short range transceiver configured to communicate with nearby monitoring devices;
- wherein the processor executes a program to perform the following three stages upon approaching the periodic preselected times:
  a) placing the monitoring device in receive mode for a first selected amount of time before reaching the periodic preselected times; wherein in receive mode the monitoring device is configured to listen for control signals identifying a transmitting monitoring device from nearby monitoring devices;
  b) placing the monitoring device in receive mode for a second selected amount of time and upon completing without detecting nearby monitoring devices, the monitoring device transmits its control signal:
  c) placing the monitoring device in receive mode for a third selected amount of time after transmitting the control signal;
- at any stage while in receive mode upon detecting a control signal transmitted from a nearby monitoring device the monitoring device waits until the end of the transmission of the control signal and records the identity of the nearby monitoring device detected;
- during the first selected amount of time and the third selected amount of time the monitoring device resumes monitoring in receive mode until completing the respective selected amount of time; during the second selected amount of time the monitoring device restarts stage b after recording the identity of the detected nearby monitoring device, without transmitting the control signal of the monitoring device.

12. The monitoring device of claim 11, wherein the second selected amount of time is unique for each monitoring device.

13. The monitoring device of claim 11, wherein the second selected amount of time is randomly selected.

14. The monitoring device of claim 13, wherein the second selected amount of time is reselected each time stage b is restarted.

15. The monitoring device of claim 11, wherein the first selected amount of time and third selected amount of time are selected based on the number of monitoring devices expected to be nearby.

16. The monitoring device of claim 11, wherein the first selected amount of time and third selected amount of time are the same for all the monitoring devices.

17. The method monitoring device of claim 11, wherein the first selected amount of time and third selected amount of time are the same for each monitoring device.

18. The monitoring device of claim 11, wherein communication time to detect nearby monitoring devices is less than a tenth of a time between two consecutive periodic preselected times.

19. The monitoring device of claim 11, wherein the first selected amount of time is selected as a function of the accuracy of the internal real-time clock of the monitoring devices and accuracy of the synchronization between the monitoring devices.

20. The monitoring device of claim 11, wherein the second selected amount of time is smaller than the third selected amount of time.

\* \* \* \* \*